Feb. 26, 1952 W. W. CUSHMAN 2,586,789
WATER INJECTOR AND METHOD
Filed Feb. 17, 1948 4 Sheets-Sheet 2
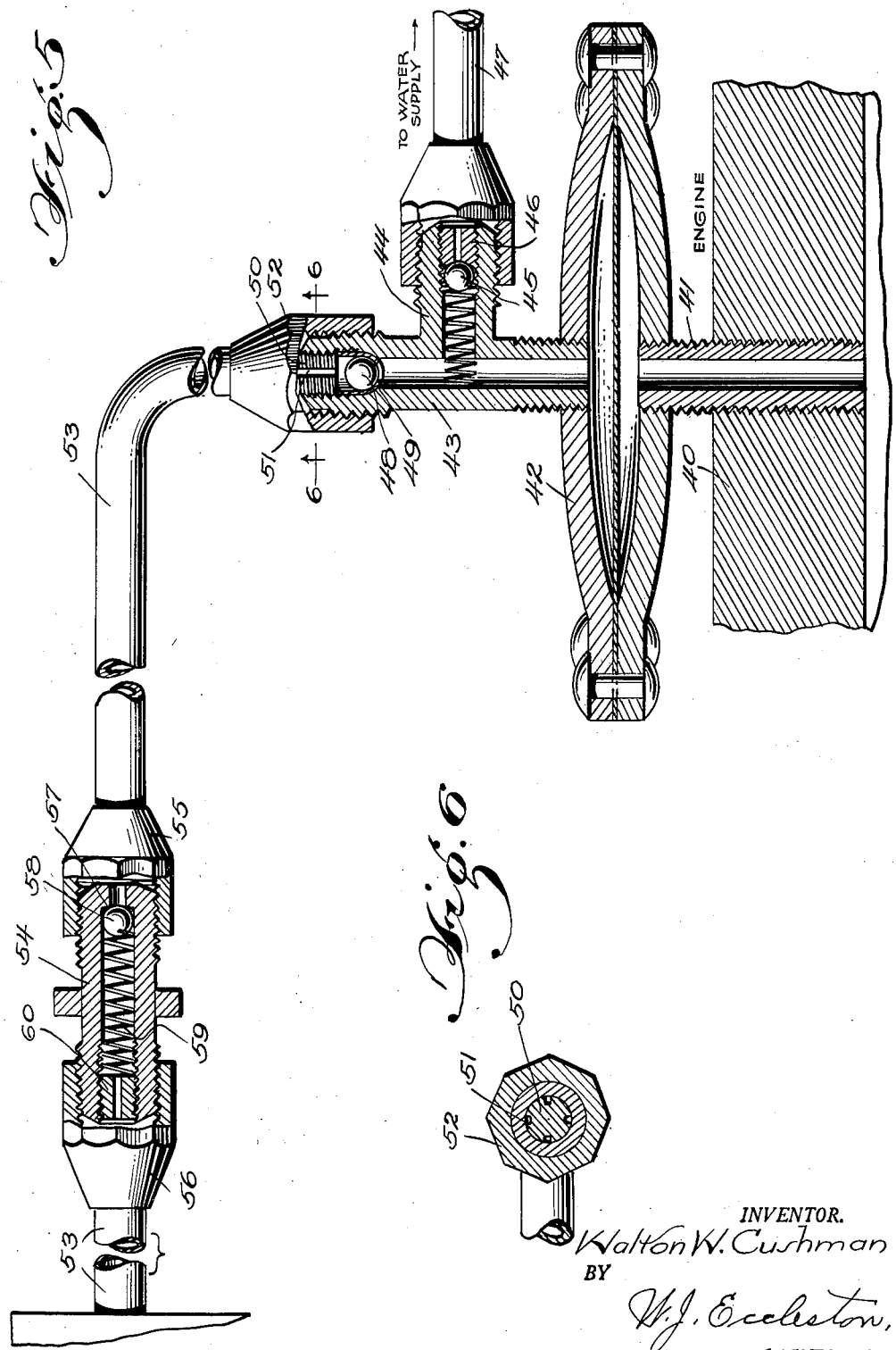
INVENTOR.
Walton W. Cushman
BY
W. J. Eccleston,
ATTORNEY

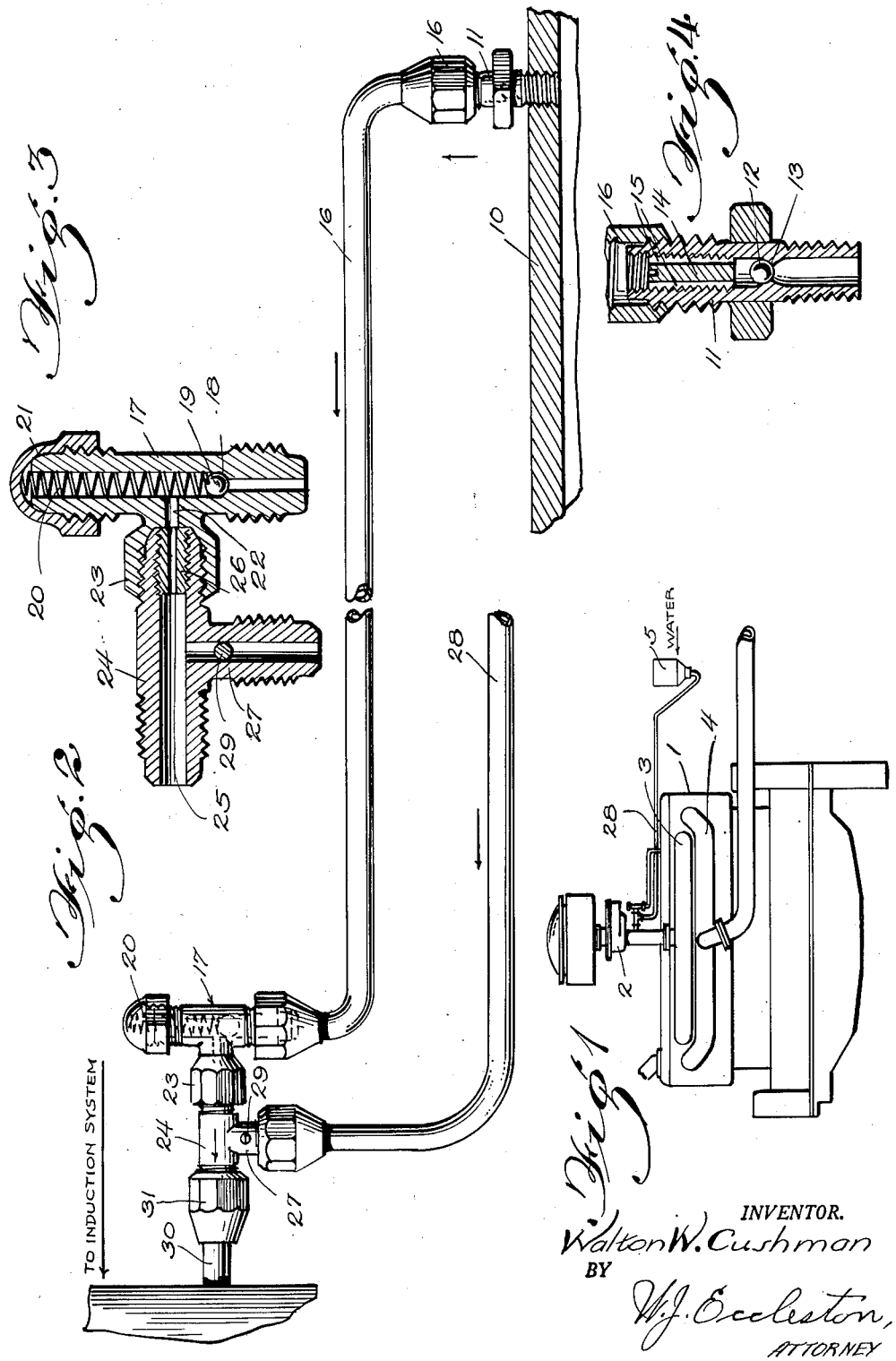

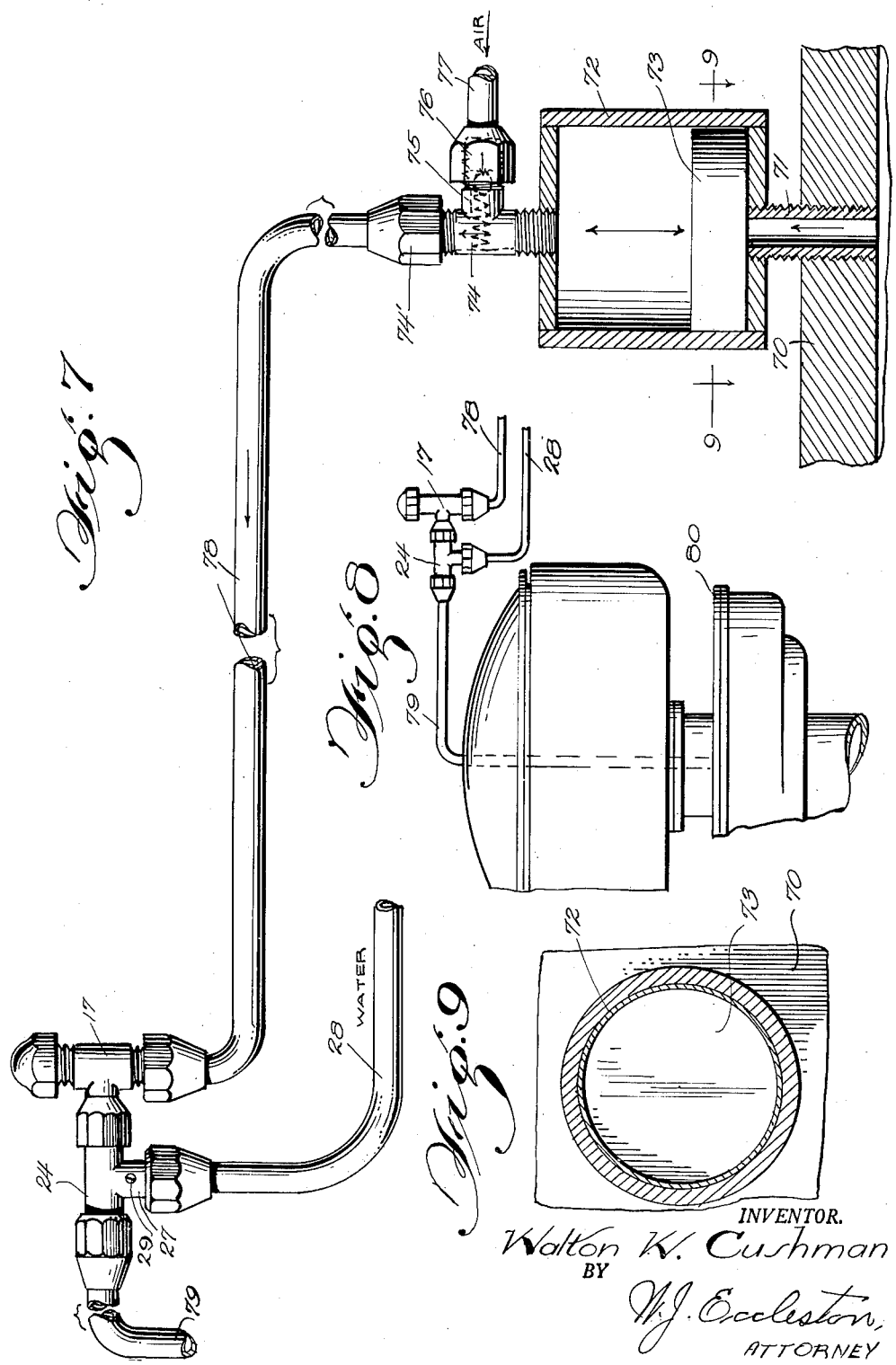

Feb. 26, 1952   W. W. CUSHMAN   2,586,789
WATER INJECTOR AND METHOD
Filed Feb. 17, 1948   4 Sheets-Sheet 4

INVENTOR.
Walton W. Cushman
BY
W. J. Eccleston,
ATTORNEY

Patented Feb. 26, 1952

2,586,789

UNITED STATES PATENT OFFICE 2,586,789

WATER INJECTOR AND METHOD

Walton W. Cushman, Webb City, Mo.

Application February 17, 1948, Serial No. 8,902

18 Claims. (Cl. 123—25)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to an apparatus and method for incorporating water in the charges of an internal combustion engine to generally improve the operation of engines of this type.

It is a well known fact that the proper amount of water incorporated in gasoline charges under certain conditions of engine load is highly desirable in reducing or eliminating detonation, economizing on gasoline consumption, maintaining proper engine temperature, etc. In many of the prior devices of this type, however, the injection of the water is under the control of the partial vacuum in the intake manifold so that at least some water enters the charge during practically the entire period of engine operation. In other prior devices the engine pressure is employed to operate a valve or the like which may permit water to enter the fuel charge, but in such devices it is necessary to add to the mechanism a pump for projecting the water into the induction system, and such devices are lacking in the step of atomizing the water as it enters the charge. Such prior methods are faulty for additional reasons including the excessive use of water, and the use of water at times which are actually detrimental to the efficiency of operation of the engine.

It is an object of the present invention therefore to provide a method of incorporating water in the engine charge which becomes effective only at such times as the engine is operating under full throttle or nearly so.

Another object of the invention resides in the provision of a water injecting apparatus adapted to be associated with the combustion chamber of the engine, and operable to inject water into the charge only in accordance with and by means of the pressures in such chamber.

Other objects and advantages of the invention will be apparent from the following description when considered in connection with the accompanying drawings, in which, Figure 1 is a side elevational view of an internal combustion engine with one form of the improved water injector installed therein;

Figure 2 is an enlarged elevational view of the valves and piping for the system;

Figure 3 is an enlarged sectional detail view of the pressure valve and control for the aspirator;

Figure 4 is an enlarged detail sectional view of a check valve mounted in the pressure pipe of the aspirator;

Figure 5 is an elevational view, partly in section, of a modified form of water injector;

Figure 6 is a horizontal sectional view taken on the line 6—6 of Figure 5;

Figure 7 is an elevational view, partly in section, of a still further modified form of the water injector;

Figure 8 is an elevational view of a carburetor and related parts showing the injection pipe of the aspirator for the injector shown in Figure 7;

Figure 9 is a horizontal sectional view taken on the line 9—9 of Figure 7, and,

Figure 10:
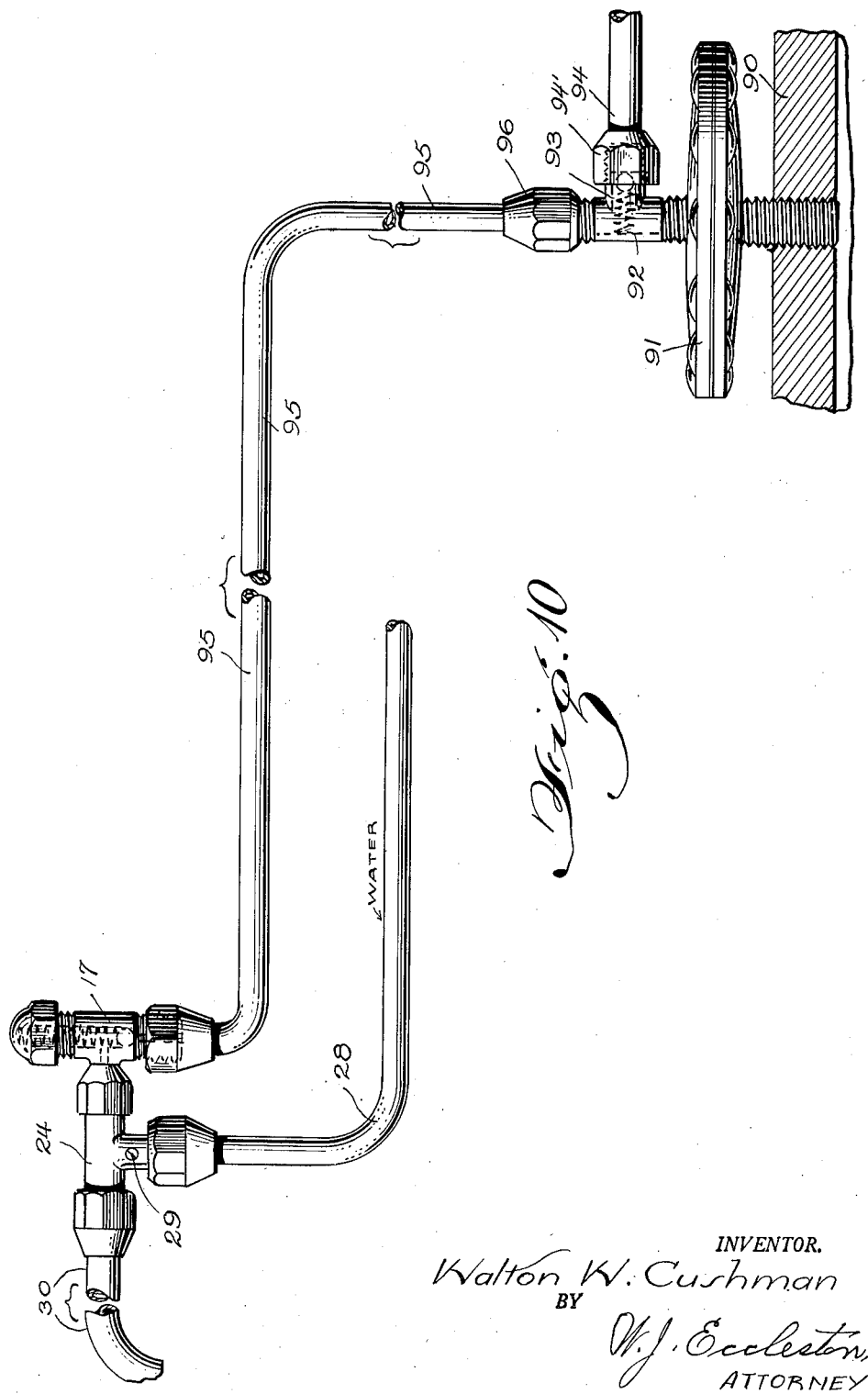
Figure 10 is an elevational view, partly in section, of a still further modified form of a water injector.

In each of the several forms of the invention a pipe is provided for conveying water to the induction system of the engine, either before or after carburetion, together with means associated with one of the combustion chambers of the engine for injecting the water into the engine charge under certain conditions, namely, when the engine is under approximately a full throttle. In the form of the invention shown in Figures 1–4 inclusive, the water injector is indicated as associated with an internal combustion engine provided with a down-draft carburetor 2. In this engine the intake manifold is indicated by numeral 3, the exhaust manifold by the numeral 4, and the tank for the water supply is indicated by the numeral 5.

In Figure 2 the numeral 10 designates the upper wall of one of the combustion chambers of the engine, preferably the combustion chamber of the fifth cylinder of a conventional 6 cylinder engine which is ordinarily provided with a compression test hole. Threaded into this hole is the casing 11 of a check valve 12 which is adapted to normally rest upon a constriction 13 within the casing. Threaded in the upper end of the casing 11 above the seat 13 is a plug 14 which limits the upward movement of the check valve but which is provided with a plurality of external grooves 15 which permit the escape of gases past the plug when the valve 12 is unseated. Threaded onto the upper end of the casing 11 is a pressure pipe 16 which is threadedly connected at its opposite end to the pressure valve casing 17 shown in detail in Figurge 3. This casing is provided with a valve seat 18 and a ball valve 19 which is normally maintained upon its seat by means of a spring 20 mounted in the upper end of the casing and held under compression by a cap 21 which is threaded onto the upper end of the valve casing and which may be adjusted to vary the amount of pressure on the valve 19.

Extending laterally through the valve casing 17 is an aperture 22 surrounded by an internally threaded boss 23 into which is threaded a pipe 24 provided with a passage 25. The end of the pipe 24 adjacent the casing 17 is provided with an apertured plug 26 the aperture of which is in alignment with the aperture 22 but of somewhat less diameter, and it will be understood that by substituting for this plug 26 plugs of different bore, the rate of flow of pressure fluid in the particular installation may be varied. Extending downwardly from the pipe 24 is a branch 27 to which a water pipe 28 is connected and the branch pipe 27 is provided with an adjusting screw 29 extending into the passage of the pipe so that the rate of flow of water therethrough may be regulated.

The end of the pipe 24 remote from the valve casing 17 is connected to the induction system by means of a pipe 30 connected thereto by means of a suitable coupling 31.

In the operation of this form of the invention the valve 13 is raised by pressure generated in the combustion chamber of the #5 cylinder and pressure is thus allowed to escaped through the channels 15 in the plug 14 to the pipe 16 up to the pressure valve 19 in valve casing 17. As the intake valve of the particular cylinder opens a negative pressure is of course created in the combustion chamber and this, in addition to the force of gravity, causes the valve 12 to descend to its seat 13. This action is of course repeated throughout the operation of the engine and pressure is thus built-up in the pressure pipe 16, but under ordinary operating conditions the pressure in pipe 16 is insufficient to raise the valve 19 against pressure of spring 20 and it is only under maximum load or thereabouts that the pressure created in the combustion chamber and consequently in the pressure pipe 16 is sufficient to open the pressure valve 19. When the valve 19 is opened a pulsation of pressure fluid passes through the aperture 22 and the plug 26 to the passage 25 of pipe 24 and through the pipe 30 into the induction system. In this passage of the pressure fluid through the pipe 24 it operates as an aspirator or pump to draw water from the pipe 16 into the passage 25 and injects it into the induction system. In this operation, therefore, it will be noted that water is supplied to the engine charge only when the engine is operating under a heavy load as determined by the pressure of spring 20 upon the pressure valve 19 and that, therefore, the amount of water supplied to the engine charges is relatively small and is supplied only under the most favorable conditions, that is, when the engine is operating under a heavy load. Moreover, the amount of water supplied may be varied by adjusting the screw 27 in the aspirator pipe 24.

In the form of the invention shown in Figures 5 and 6 the wall of the combustion chamber is indicated by the numeral 40 and has connected thereto, as by means of pipe 41, a diaphragm pump 42. Connected to the upper compartment of the diaphragm pump 42 is a pipe 43 provided with a lateral extension 44 in which is mounted a spring-pressed check valve 45 adapted to normally seat on the inner end of an apertured plug 46 threaded into the outer end of the pipe 44. Connected to this pipe 44 is a water supply pipe 47 which communicates with a source of supply such as the water tank 5 shown in Figure 1.

Mounted in the upper end of the pipe 43 is a ball check valve 48 cooperating with a seat 49 formed on the interior of the pipe. A threaded plug 50 is mounted in the upper end of the pipe 43 and is formed with grooves 51 to permit the passage of water past the plug when the valve 48 is unseated. Also threaded onto the upper end of the pipe 43 but exteriorly thereof, is a coupling 52 by means of which a pipe 53 is connected with and communicates with the pipe 43. Adjacent the induction system of the engine the pipe 53 is provided with a coupling comprising the short length of pipe 54, and the coupling members 55 and 56. Within the pipe 54, which is provided with a valve seat 57, is a ball valve 58 which is normally pressed against its seat by means of a spring 59 mounted within the pipe 54 and having one end in engagement with the ball valve 58 and the opposite end in engagement with an apertured plug 60 threaded into the end of the pipe. Plugs 60 having apertures of different diameter may be mounted in the pipe 54 so as to vary the amount of water which may be injected into the induction system of the engine.

In this form of the invention the amount of pressure in the combustion chamber necessary to cause an injection of water into the induction system may be varied by adjusting the position of the plug 60 so as to vary the compression of the spring 59 against the valve 58.

As the engine operates, successive positive and negative pressures are applied to the undersurface of the diaphragm in the pump 42 thus causing the diaphragm to rise and fall and thereby apply positive and negative pressures within the pipe 43. This action within the pipe 43 alternately opens and closes the valve 45 thus permitting water to be drawn from the pipe 47 and forced past the check valve 48 to provide a supply of water under pressure in the pipe 53. Therefore, when pressures occur in the combustion chamber of an amount slightly in excess of that to which the pressure valve 58 is adjusted, a charge of water will be forced against this valve and caused to enter the induction system of the engine. As just mentioned, the amount of water entering the induction system when the engine is at full load may be varied by substituting a plug 60 having an aperture of different diameter from that shown.

In the form of the invention shown in Figures 7-9 inclusive, many of the parts are identical with those shown in Figures 1-4 inclusive and since these parts are indicated by the reference numerals used in Figures 1-4 a description of these parts in detail is believed to be neither desirable nor necessary. The construction of this modified form of the invention differs from that shown in Figures 1-6 inclusive in that the mechanical means for supplying pressure to the pressure pipe is somewhat different and in the fact that the water is injected into the induction system before carburetion.

In Figure 7 the wall of the combustion chamber is indicated by the numeral 70 and communication therewith is provided by means of a pipe 71 threaded into the wall of the cylinder. Mounted on the upper end of the pipe 71 is a cylinder 72 provided with a freely movable piston 73 and the upper wall of the cylinder communicates with a pipe 74 threaded thereto. This pipe is provided with a lateral extension 75 corresponding with the extension 44 shown in Figure 5 and provided with a check valve such as shown in Figure 5 and generally indicated by the numeral 76 in this modification and open to the atmosphere by means of a pipe 77. Connected to the upper end of the pipe 74 is check valve 74' as well as a pressure pipe 78, to the opposite end of which are connected the pressure valve 17 of Figure 2 as well as the aspirator 24 and related parts. Also connected to the pipe 24 is the water pipe 28 of Figure 2 and the adjusting screw 29 for varying the area of the passageway and thus varying the rate of flow of water to the induction system. From the aspirator 24 a pipe 79 leads to the induction system just above the carburetor 80 as clearly shown in Figure 8.

The operation of this form of the invention is quite similar to that shown in Figure 1 except that instead of directly supplying fluid from the combustion chamber into the pressure pipe 78 air under pressure is supplied to this pipe by the action of the piston 73 which is caused to reciprocate within its cylinder 72 by reason of the positive and negative pressures created in the combustion chamber and in the pipe 71 communicating therewith. The reciprocation of the piston 73 will draw air into the pipe 74 through the check valve 76 and thence force it past the check valve 74' into the pipe 78. When the pressure in this pipe becomes greater than that for which the pressure valve 17 is adjusted, that is, when the engine is under full load, the valve will open and pulsations of pressure will pass through the aspirator 24 thereby inducing water from the pipe 28 into the pipe 79 and thence to the induction system.

The form of the invention shown in Figure 10 is closely related to that shown in Figure 7 except that in lieu of the cylinder and piston 72—73 of Figure 7 a diaphragm pump such as shown in Figure 5 is employed. In this modified form the combustion chamber is indicated by the numeral 90 and the diaphragm pump by the numeral 91. A pipe 92 corresponding to pipes 43 and 74 respectively of Figures 5 and 7 is connected to the upper wall of the diaphragm pump and is provided with a lateral extension 93 to which is coupled an air inlet 94 provided with a check valve 94' such as the valve 44 of Figure 5. To the upper end of pipe 92 is connected a pressure pipe 95 as by means of coupling 96 in which is a check valve similar to those shown in Figures 5 and 7. The assembly shown in the left of Figure 10 is identical with that shown in Figures 3 and 7 and identical reference numerals are employed to indicate these parts, namely, the pressure valve 17, the aspirator pipe 24, regulating screw 29, pipe 30 leading to the induction system, and water pipe 28.

The operation of this modified form is substantially identical with the operation of the form shown in Figure 7. That is to say, as the diaphragm of the pump 91 pulsates it pumps air into the pressure pipe 95 but will not cause the aspirator 24 to operate until such time as the pressure created in the combustion chamber 90 is sufficient to open the pressure valve 17. When the pressure valve 17 is opened the pressure passing therethrough and through the aspirator pipe 24 will cause water to be injected into the induction system through the pipe 30.

Basically, all of the several species of the invention are identical in that the injection of water into the fuel system is based solely upon the pressure created in the combustion chamber of one of the cylinders of the engine, and due to this method of operation and the structure by which it is carried out, it will be apparent to those skilled in the art that the amount of water used is very substantially less than that required in water induction systems heretofore known, and that the operation of the engine is greatly improved due to the fact that water is admitted to the charge only at such times as are most advantageous to engine operation, that is, when the engine is under full load or nearly so.

The expression "induction system of an internal combustion engine," as used in the claims, refers to the intake manifold and related parts exclusive of the engine cylinder with which the present apparatus is associated.

In compliance with the patent statutes I have described what I now consider to be the preferred forms of the invention but inasmuch as a variety of means may be employed within the limits of the invention, it is intended that all such variations be included within the scope of the appended claims.

I claim:

1. The method of injecting water into the fuel entering an internal combustion engine which comprises providing a supply of water, taking fluid pressure from a combustion chamber of the engine, and using such pressure for injecting water into the fuel.

2. The method of injecting water into the fuel charges of an internal combustion engine under maximum load conditions only, which comprises providing a supply of water, and employing only maximum pressures in the explosion chamber for injecting charges of water into the gasoline charges prior to entering the cylinders.

3. A water injector for internal combustion engines comprising a water container, a pipe leading from the container to a point adjacent the induction system, a pressure pipe communicating with a combustion chamber of the engine and with the induction system, and a connection between the pressure pipe and water pipe.

4. A water injector for internal combustion engines comprising a water container, a pipe leading therefrom to a point adjacent the induction system, a pressure pipe communicating with a combustion chamber of the engine and with the induction system, and an aspirating connection between the two pipes.

5. A water injector for internal combustion engines comprising a water container, an aspirator communicating with the induction system of the engine, a water pipe leading from the container to the aspirator, a pressure pipe communicating with a combustion chamber of the engine and with the aspirator, and a pressure valve in the pressure pipe.

6. A water injector for internal combustion engines comprising a water container, an aspirator communicating with the induction system of the engine, a water pipe leading from the container to the aspirator, and means for creating suction in the aspirator, said means including a pipe connected to the aspirator and exposed to pressures in a combustion chamber of the engine.

7. A water injector for internal combustion engines comprising a water container, an aspirator communicating with the induction system of the engine, a water pipe leading from the container to the aspirator, and means for activating the aspirator, said means including a pressure pipe in communication with the aspirator, and a fluid-pressure pump operatively connected to a combustion chamber of the engine and to the pressure pipe.

8. A water injector for internal combustion engines comprising a water container, an aspirator communicating with the induction system of the engine, a water pipe leading from the container to the aspirator, and means for activating the aspirator, said means including a pressure pipe in communication with the aspirator, a pressure valve in the pressure pipe, and a fluid-pressure pump operatively connected to a combustion chamber of the engine and to the pressure pipe.

9. A water injector for internal combustion engines comprising a water container, an aspirator communicating with the induction system of the engine, a water pipe leading from the container to the aspirator, and means for activating the aspirator, said means including a pressure pipe in communication with the aspirator, and a fluid-pressure pump operatively connected to the pressure pipe and exposed to the positive and negative pressures of a combustion chamber of the engine.

10. A water injector for internal combustion engines comprising a water container, an aspirator communicating with the induction system of the engine, a water pipe leading from the container to the aspirator, and means for activating the aspirator, said means including a pressure pipe in communication with the aspirator, and a fluid-pressure pump comprising a cylinder and piston exposed to the pressures in a combustion chamber of the engine and connected to the pressure pipe.

11. The method of injecting liquid into the induction system of an internal combustion engine which comprises providing a supply of water and pumping portions thereof into the induction system in accordance with pressures developed in a combustion chamber of the engine.

12. The method of injecting liquid into the induction system of an internal combustion engine which comprises providing a supply of water and pumping portions thereof into the induction system through the medium of pressures developed in a combustion chamber of the engine.

13. A water injector for internal combustion engines comprising a water container, a pipe leading from the container to the induction system, and a pump connected with the pipe and a combustion chamber of the engine.

14. A water injector for internal combustion engines comprising a water container, a pipe leading therefrom to the induction system of the engine, a pressure operated pump connected with the pipe, said pump connected with a combustion chamber of the engine to expose it to pressure fluids developed in the chamber.

15. A water injector for internal combustion engines comprising a water container, a piping system leading from the container to the induction system, check valves and pressure-operated valves in said system, and a pressure-operated pump operatively connected with the combustion chamber of a cylinder and with said piping system.

16. A water injector for internal combustion engines comprising a water container, a piping system leading from the container to the induction system, check valves and pressure-operated valves in said system, and a diaphragm pump having one side exposed to pressures withing a cylinder of the engine and the other side to the interior of the piping system.

17. A water injector for internal combustion engines comprising a water container, a piping system leading from the container to the induction system, and a pressure-operated pump operatively connected with the combustion chamber of a cylinder and with said piping system.

18. A water injector for internal combustion engines comprising a water container, a piping system leading from the container to the induction system, an adjustable pressure operated valve in said system, and a pressure-operated pump operatively connected with the combustion chamber of a cylinder and with said piping system.

WALTON W. CUSHMAN.

REFERENCES CITED

The following references are of record in the file of this patent:

UNITED STATES PATENTS

| Number | Name | Date |
|---|---|---|
| 795,422 | Thomson | July 25, 1905 |
| 1,528,665 | Fischer | Mar. 3, 1925 |
| 1,530,464 | Leedom | Mar. 17, 1925 |
| 2,073,887 | Strancke | Mar. 16, 1937 |

FOREIGN PATENTS

| Number | Country | Date |
|---|---|---|
| 259,127 | Germany | Apr. 15, 1915 |